(12) United States Patent
Liu et al.

(10) Patent No.: US 11,877,323 B2
(45) Date of Patent: Jan. 16, 2024

(54) RANDOM ACCESS METHOD, USER EQUIPMENT AND NETWORK SIDE DEVICE

(71) Applicants: China Mobile Communication Co., Ltd Research Institute, Beijing (CN); China Mobile Communications Group Co., Ltd., Beijing (CN)

(72) Inventors: Liang Liu, Beijing (CN); Yang Liu, Beijing (CN); Nan Hu, Beijing (CN); Nan Li, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 45 days.

(21) Appl. No.: 17/051,877

(22) PCT Filed: Apr. 30, 2019

(86) PCT No.: PCT/CN2019/085103
§ 371 (c)(1),
(2) Date: Oct. 30, 2020

(87) PCT Pub. No.: WO2019/210838
PCT Pub. Date: Nov. 7, 2019

(65) Prior Publication Data
US 2021/0329710 A1    Oct. 21, 2021

(30) Foreign Application Priority Data
May 2, 2018 (CN) .......................... 201810409935.3

(51) Int. Cl.
*H04W 74/08* (2009.01)
*H04W 56/00* (2009.01)
(Continued)

(52) U.S. Cl.
CPC ..... *H04W 74/0841* (2013.01); *H04W 56/001* (2013.01); *H04W 72/0446* (2013.01);
(Continued)

(58) Field of Classification Search
CPC ........... H04W 74/0841; H04W 74/008; H04W 74/0891; H04W 74/004; H04W 74/0833;
(Continued)

(56) References Cited

U.S. PATENT DOCUMENTS 10,278,160 B2 * 4/2019 Agiwal ................. H04W 72/20
10,813,137 B2 * 10/2020 Shih ....................... H04W 72/23
(Continued)

FOREIGN PATENT DOCUMENTS

| CN | 101198151 A | 6/2008 |
|---|---|---|
| CN | 106982467 A | 7/2017 |

(Continued)

OTHER PUBLICATIONS

Remaining details of RACH procedure, 3GPP TSG RAN WG1 Meeting #91, R1-1719346, ZTE, Sanechips, Nov.-Dec. 1, 2017, Reno, USA, 30 pages.
(Continued)

*Primary Examiner* — Redentor Pasia
(74) *Attorney, Agent, or Firm* — Price Heneveld LLP

(57) ABSTRACT

The present disclosure provides a random access method, a UE and a network side device. The random access method includes: initiating random access on one or more SS blocks; and sending random access information on each SS block to the network side device.

14 Claims, 5 Drawing Sheets

(51) Int. Cl.
*H04W 72/0446* (2023.01)
*H04W 72/0453* (2023.01)
*H04W 74/00* (2009.01)

(52) U.S. Cl.
CPC ..... *H04W 72/0453* (2013.01); *H04W 74/008* (2013.01); *H04W 74/0891* (2013.01)

(58) Field of Classification Search
CPC ........... H04W 56/001; H04W 72/0446; H04W 72/0453; H04W 48/10
See application file for complete search history.

(56) References Cited

U.S. PATENT DOCUMENTS

| | | | |
|---|---|---|---|
| 10,917,825 B2* | 2/2021 | Peisa | H04B 7/0617 |
| 2014/0241285 A1 | 8/2014 | Pang et al. | |
| 2014/0362701 A1 | 12/2014 | Roh et al. | |
| 2014/0376466 A1* | 12/2014 | Jeong | H04W 74/0833 370/329 |
| 2017/0251460 A1 | 8/2017 | Agiwal et al. | |
| 2017/0367069 A1 | 12/2017 | Agiwal et al. | |
| 2018/0109345 A1 | 4/2018 | Svedman et al. | |
| 2018/0279380 A1* | 9/2018 | Jung | H04W 74/0833 |
| 2019/0069322 A1* | 2/2019 | Davydov | H04W 74/006 |
| 2019/0075447 A1* | 3/2019 | Lee | H04W 68/02 |
| 2019/0104544 A1* | 4/2019 | Axnäs | H04W 74/004 |
| 2019/0110314 A1* | 4/2019 | Abedini | H04W 72/23 |
| 2019/0116613 A1* | 4/2019 | Abedini | H04W 74/02 |
| 2019/0132778 A1* | 5/2019 | Park | H04W 36/30 |
| 2019/0159258 A1* | 5/2019 | Islam | H04L 5/0048 |
| 2019/0313345 A1* | 10/2019 | Jiang | H04W 74/0833 |
| 2019/0364596 A1* | 11/2019 | Axnäs | H04W 72/0446 |
| 2020/0029289 A1 | 1/2020 | Liu | |
| 2020/0037297 A1* | 1/2020 | Pan | H04B 7/0695 |
| 2020/0252969 A1* | 8/2020 | Chen | H04W 56/001 |
| 2020/0275479 A1* | 8/2020 | Peisa | H04W 74/04 |
| 2020/0288503 A1* | 9/2020 | Sahlin | H04W 16/28 |
| 2020/0296765 A1* | 9/2020 | Kim | H04W 74/006 |
| 2020/0344815 A1* | 10/2020 | Svedman | H04W 56/001 |
| 2021/0127324 A1* | 4/2021 | Agiwal | H04W 74/004 |
| 2021/0136823 A1* | 5/2021 | Kim | H04W 74/008 |

FOREIGN PATENT DOCUMENTS

| | | |
|---|---|---|
| CN | 107278383 A | 10/2017 |
| CN | 107528682 A | 12/2017 |
| CN | 107969010 A | 4/2018 |
| WO | 2018064372 A1 | 4/2018 |
| WO | 2018204863 A1 | 11/2018 |

OTHER PUBLICATIONS

Qualcomm Inc., "Remaining Details on RACH Procedure", 3GPP TSG-RAN WG1 Meeting RAN1 AH 1801, R1-1800851, Vancouver, Canada, Jan. 22-Jan. 26, 2018.

Sony, "Considerations on Beam Reporting in RACH Procedure", 3GPP TSG RAN WG1 Meeting #91, R1-1720454, Reno, USA, Nov. 27-Dec. 1, 2017.

Qualcomm Inc., "PRACH Procedure Considerations", 3GPP TSG-RAN WG1 Meeting #90bis, R1-1718532, Prague, Czech Republic, Oct. 9-13, 2017.

* cited by examiner

RANDOM ACCESS METHOD, USER EQUIPMENT AND NETWORK SIDE DEVICE

CROSS-REFERENCE TO RELATED APPLICATION

The present application is the U.S. national phase of PCT Application No. PCT/CN2019/085103 filed on Apr. 30, 2019, which claims a priority of the Chinese patent application No. 201810409935.3 filed on May 2, 2018, which are incorporated herein by reference in their entirety.

TECHNICAL FIELD

The present disclosure relates to the field of wireless communications technology, in particular to a random access method, a User Equipment (UE), and a network side device.

BACKGROUND

In order to facilitate the optimization of random access parameters for a network side device, the network side device has a capability of inquiring a UE accessing a network of random access information. Upon the receipt of an inquiry, the UE returns corresponding information to the network side device. In a conventional Long Term Evolution (LTE), a transmission antenna is omnidirectional, so the UEs around the network side device share a same group of random access preambles. During the feedback of the random access information to the network side device, the UE merely sends the number of preambles and an identifier indicating whether there is a conflict during the transmission of the preamble.

In a $5^{th}$-Generation (5G) technology, a spectrum resource at a frequency much higher than that used in the LTE (e.g., a millimeter wave at a frequency greater than 10 GHz) will be used for the wireless communications. In order to enhance signal coverage, a beamforming technology is used in the 5G. At a random access phase, the beamforming is presented in the form of Synchronization Signal (SS) blocks. There is no such concept about the SS block in a $4^{th}$-Generation (4G) technology, so there is no binding relationship between a random access resource (random access time-frequency resource and/or preamble sequence) and the SS block. In this regard, when a conventional feedback mechanism is adopted, it is impossible for the network side device to know a random access conflict on each SS block.

SUMMARY

An object of the present disclosure is to provide a random access method and a UE, so as to solve the problem in the related art where it is impossible for the network side device, through the conventional feedback mechanism, to know the random access conflict on each SS block.

In one aspect, the present disclosure provides in some embodiments a random access method for a UE, including: initiating random access on one or more SS blocks; and sending random access information on each SS block to a network side device.

In a possible embodiment of the present disclosure, the sending the random access information on each SS block to the network side device includes sending an SS block index to the network side device.

In a possible embodiment of the present disclosure, the sending the random access information on each SS block to the network side device includes sending the number of preambles sent on each SS block to the network side device.

In a possible embodiment of the present disclosure, the number of preambles sent on each SS block includes the number of preambles sent on each unsuccessfully-accessed SS block and/or the number of preambles sent on a successfully-accessed SS block.

In a possible embodiment of the present disclosure, the sending the random access information on each SS block to the network side device includes sending information about a time-frequency resource for the random access on each SS block to the network side device.

In a possible embodiment of the present disclosure, the information about the time-frequency resource includes an index with which the time-frequency resource is associated.

In another aspect, the present disclosure provides in some embodiments a random access method for a network side device, including receiving random access information on each SS block from a UE.

In a possible embodiment of the present disclosure, the receiving the random access information on each SS block from the UE includes receiving the number of preambles sent on each SS block from the UE.

In a possible embodiment of the present disclosure, the number of preambles sent on each SS block includes the number of preambles sent on each unsuccessfully-accessed SS block and/or the number of preambles sent on a successfully-accessed SS block.

In a possible embodiment of the present disclosure, the receiving the random access information on each SS block from the UE includes receiving information about a time-frequency resource for random access on each SS block from the UE.

In a possible embodiment of the present disclosure, the information about the time-frequency resource includes an index with which the time-frequency resource is associated.

In yet another aspect, the present disclosure provides in some embodiments a UE, including a first processor and a first transceiver. The first processor is configured to initiate random access on one or more SS blocks, and the first transceiver is configured to send random access information on each SS block to a network side device.

In a possible embodiment of the present disclosure, the first transceiver is further configured to send the number of preambles sent on each SS block to the network side device, and the number of preambles sent on each SS block includes the number of preambles sent on each unsuccessfully-accessed SS block and/or the number of preambles sent on a successfully-accessed SS block.

In a possible embodiment of the present disclosure, the first transceiver is further configured to send information about a time-frequency resource for the random access on each SS block to the network side device, and the information about the time-frequency resource includes an index with which the time-frequency resource is associated.

In still yet another aspect, the present disclosure provides in some embodiments a network side device, including a second processor and a second transceiver. The second transceiver is configured to receive random access information on each SS block from a UE.

In a possible embodiment of the present disclosure, the second transceiver is further configured to receive the number of preambles sent on each SS block from the UE, and the number of preambles sent on each SS block includes the number of preambles sent on each unsuccessfully-accessed SS block and/or the number of preambles sent on a successfully-accessed SS block.

In a possible embodiment of the present disclosure, the second transceiver is further configured to receive information about a time-frequency resource for random access on each SS block from the UE, and the information about the time-frequency resource includes an index with which the time-frequency resource is associated.

In still yet another aspect, the present disclosure provides in some embodiments a UE, including a processor, a memory, and a random access program stored in the memory and executed by the processor. The processor is configured to execute the random access program so as to implement the above-mentioned random access method.

In still yet another aspect, the present disclosure provides in some embodiments a network side device, including a processor, a memory, and a random access program stored in the memory and executed by the processor. The processor is configured to execute the random access program so as to implement the above-mentioned random access method.

In still yet another aspect, the present disclosure provides in some embodiments a computer-readable storage medium storing therein a random access program. The random access program is executed by a processor so as to implement any of the above-mentioned random access methods.

The embodiments of the present disclosure have the following beneficial effects. The UE may initiate the random access on one or more SS blocks and send the random access information on each SS block to the network side device. As a result, it is able for the network side device in a wireless communications system using a beamforming technology to know a random access conflict on each SS block, thereby to facilitate the optimization of random access parameters for the network side device.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
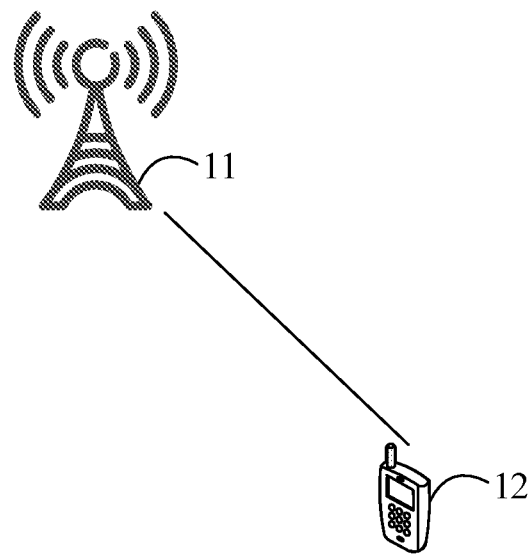
FIG. 1 is a schematic view showing a wireless communications system according to one embodiment of the present disclosure.

As shown in FIG. 1, the present disclosure provides in some embodiments a wireless communications system, which includes a network side device 11 and a UE 12. In actual use, the devices may be connected to each other in a wireless manner. A solid line is adopted in FIG. 1, so as to conveniently, intuitively show a connection relationship between the devices.

It should be appreciated that, the communications system may include a plurality of UEs, and the network side device may communicate with the plurality of UEs (signaling or data transmission).

The network side device may be a network side device in a 5G system (e.g., next-generation node base station (gNB) or Transmission and Reception Point (TRP)).

The UE may be mobile phone, tablet computer, laptop computer, Ultra-Mobile Personal Computer (UMPC), netbook or Personal Digital Assistant (PDA).

Figure 2:
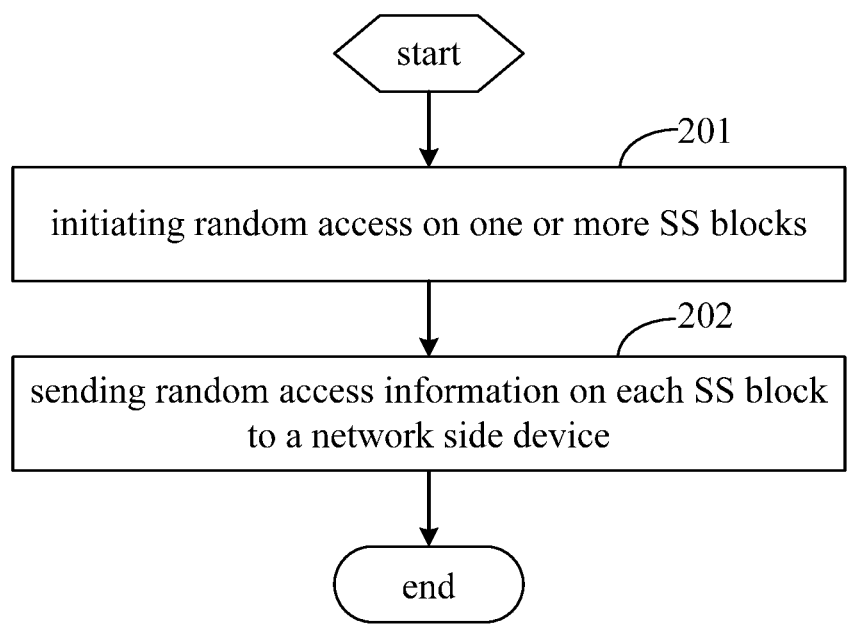
FIG. 2 is a flow chart of a random access method according to one embodiment of the present disclosure.

As shown in FIG. 2, the present disclosure provides in some embodiments a random access method for a UE, which includes the following steps.

Step 201: initiating random access on one or more SS blocks.

In the embodiments of the present disclosure, in a random access process, the UE may initiate the random access on different SS blocks for the following reasons.

(1) The UE moves and has detected an SS block with better downlink channel quality.

(2) A plurality of UEs accesses a network on a same SS block and a conflict occurs, so the UE fails to transmit a preamble and initiates the random access on another SS block.

Step 202: sending random access information on each SS block to a network side device.

In the embodiments of the present disclosure, the random access information may be used to indicate a random access conflict on a corresponding SS block.

In the embodiments of the present disclosure, situations where the UEs initiate the contention-based random access on each SS block may be different from each other, so it is impossible for the network side device to know a correspondence between the random access conflict for the UE and the SS block, thereby it is impossible to subsequently optimize random access parameters.

Based on the above, the UE needs to send the random access information on each SS block where the random access has been attempted to the network side device, and the SS blocks where the random access has been attempted may include one successfully-accessed SS block and/or one or more unsuccessfully-accessed SS blocks.

In this regard, the UE may initiate the random access on the one or more SS blocks, and send the random access information on each SS block to the network side device. As a result, it is able for the network side device in a wireless communications system using a beamforming technology to know a random access conflict on each SS block, thereby to facilitate the optimization of random access parameters for the network side device.

In a possible embodiment of the present disclosure, the sending the random access information on each SS block to the network side device may include sending an SS block index to the network side device.

Figure 3:
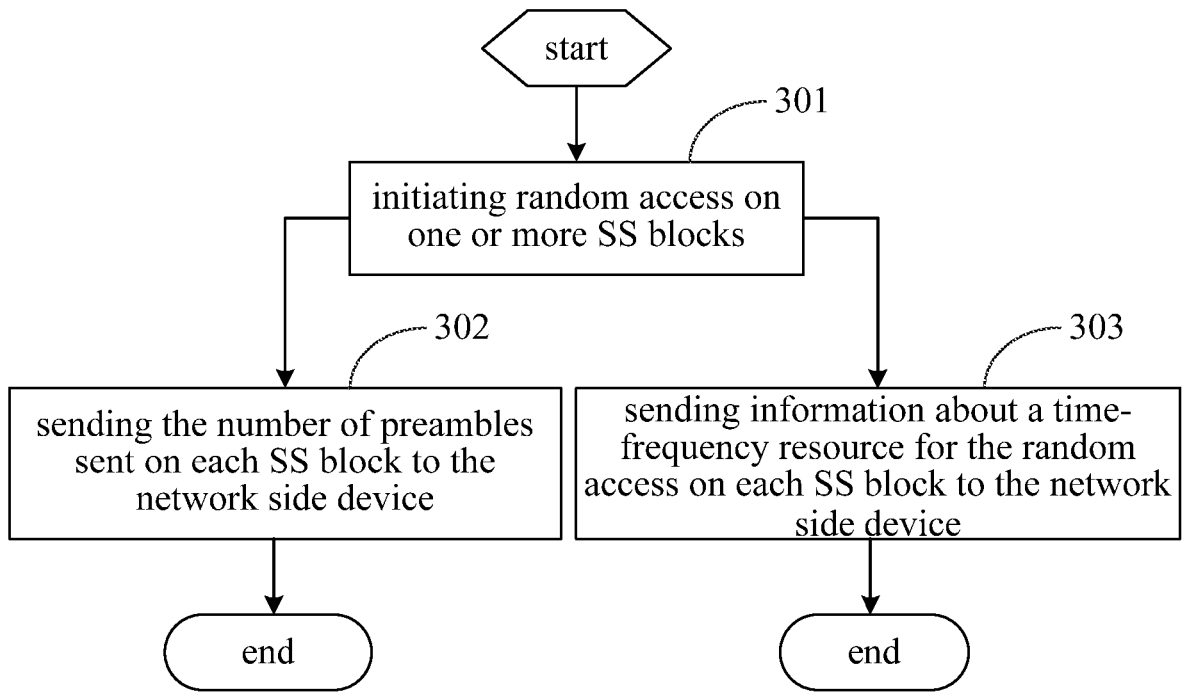
FIG. 3 is another flow chart of the random access method according to one embodiment of the present disclosure.

As shown in FIG. 3, the present disclosure provides a random access method for a UE, which includes the following steps.

Step 301: initiating random access on one or more SS blocks. One of Steps 302 and 303 may be performed subsequently, or both of them may be performed simultaneously.

In the embodiments of the present disclosure, in a random access process, the UE may initiate the random access on different SS blocks for the following reasons.

1. The UE moves and has detected an SS block with better downlink channel quality.
2. A plurality of UEs accesses a network on a same SS block and a conflict occurs, so the UE fails to transmit a preamble and initiates the random access on another SS block.

Step 302: sending the number of preambles sent on each SS block to the network side device.

In the embodiments of the present disclosure, the number of preambles sent on each SS block may include two parts, i.e., the number of preambles sent on each unsuccessfully-accessed SS block and the number of preambles sent on a successfully-accessed SS block. It should be appreciated that, before the UE successfully accesses a certain SS block, the UE has unsuccessfully accessed the other SS blocks for one or more times, so there may exist a plurality of results of the number of preambles sent on the unsuccessfully-accessed SS block. However, there may exist merely one result of the number of preambles sent on the successfully-accessed SS block.

Step 303: sending information about a time-frequency resource for the random access on each SS block to the network side device.

Figure 4:
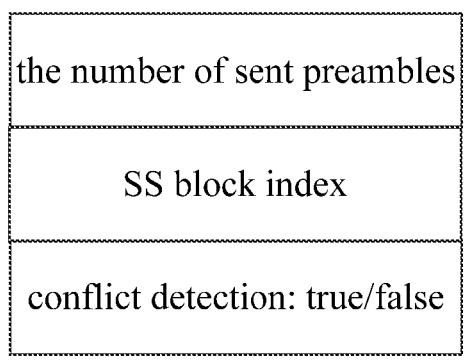
FIG. 4 is a schematic view showing a format for sending information according to one embodiment of the present disclosure.

In the embodiments of the present disclosure, the information about the time-frequency resource may include an index with which the time-frequency resource is associated. The UE may send the class index and the number of preambles to the network side device. To be specific, FIG. 4 shows a format for sending, by the UE, information to the network side device. In a 5G wireless communications system using a beamforming technology, usually the time-frequency resource is an SS block, so the class index of a class to which the time-frequency resource belongs in FIG. 4 may be an SS block index. The network side device may determine a correspondence between the random access conflict and the SS block in accordance with the number of preambles, the SS block index and a conflict detection result.

In this regard, the UE may initiate the random access on the one or more SS blocks, and send the number of preambles sent on each SS block and/or the information about the time-frequency resource for the random access on each SS block to the network side device. As a result, it is able for the network side device in the wireless communications system using the beamforming technology to know a random access conflict on each SS block, thereby to facilitate the optimization of random access parameters for the network side device.

Figure 5:
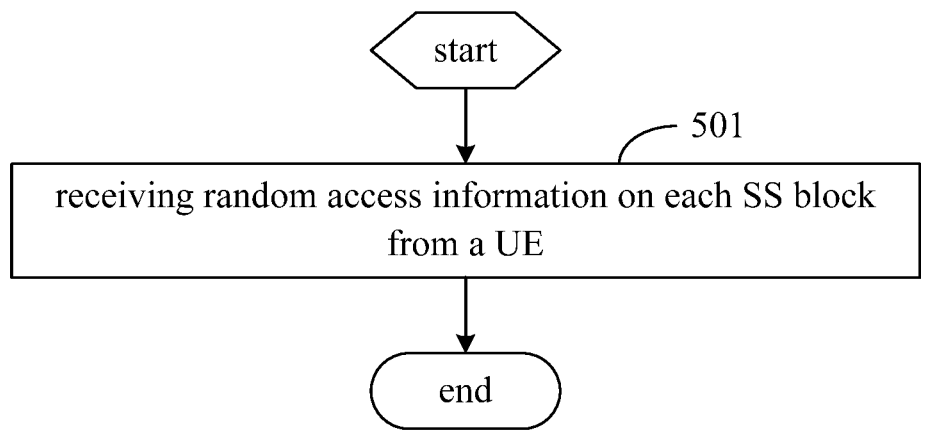
FIG. 5 is a flow chart of another random access method according to one embodiment of the present disclosure.

As shown in FIG. 5, the present disclosure further provides in some embodiments a random access method for a network side device, which includes Step 501 of receiving random access information on each SS block from a UE.

In the embodiments of the present disclosure, the network side device may receive the random access information on each SS block where the random access has been attempted from the UE, and the SS blocks where the random access has been attempted may include one successfully-accessed SS block and/or one or more unsuccessfully-accessed SS blocks.

In this regard, the network side device may receive the random access information on each SS block from the UE, so it is able for the network side device in a wireless communications system using a beamforming technology to know a random access conflict on each SS block, thereby to facilitate the optimization of random access parameters for the network side device.

Figure 6:
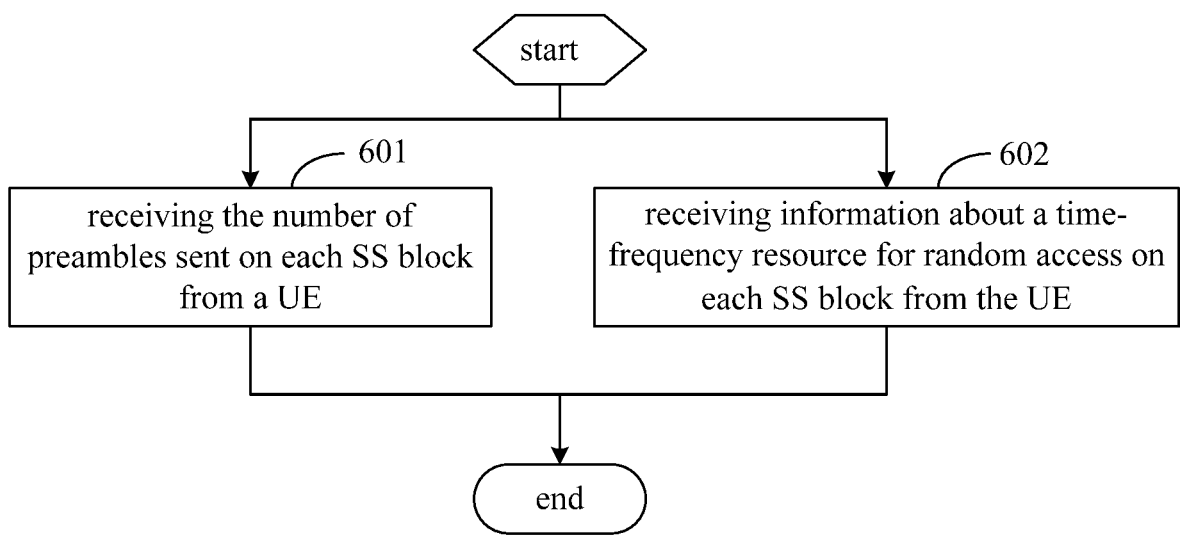
FIG. 6 is another flow chart of the other random access method according to one embodiment of the present disclosure.

As shown in FIG. 6, the present disclosure further provides in some embodiments a random access method for a network side device, e.g., a base station, which includes the following steps.

Step 601: receiving the number of preambles sent on each SS block from a UE.

In the embodiments of the present disclosure, the number of preambles sent on each SS block may include two parts, i.e., the number of preambles sent on each unsuccessfully-accessed SS block and the number of preambles sent on a successfully-accessed SS block. It should be appreciated that, before the UE successfully accesses a certain SS block, the UE has unsuccessfully accessed the other SS blocks for one or more times, so there may exist a plurality of results of the number of preambles sent on the unsuccessfully-accessed SS block. However, there may exist merely one result of the number of preambles sent on the successfully-accessed SS block.

Step 602: receiving information about a time-frequency resource for random access on each SS block from the UE.

In the embodiments of the present disclosure, the information about the time-frequency resource may include an index with which the time-frequency resource is associated.

It should be appreciated that, Steps 601 and 602 may be performed by the network side device simultaneously, or merely one of them may be performed.

In this regard, the network side device may receive the number of preambles sent on each SS block and/or the information about the time-frequency resource for the random access on each SS block from the UE, so it is able for the network side device in a wireless communications system using a beamforming technology to know a random access conflict on each SS block, thereby to facilitate the optimization of random access parameters for the network side device.

Figure 7:
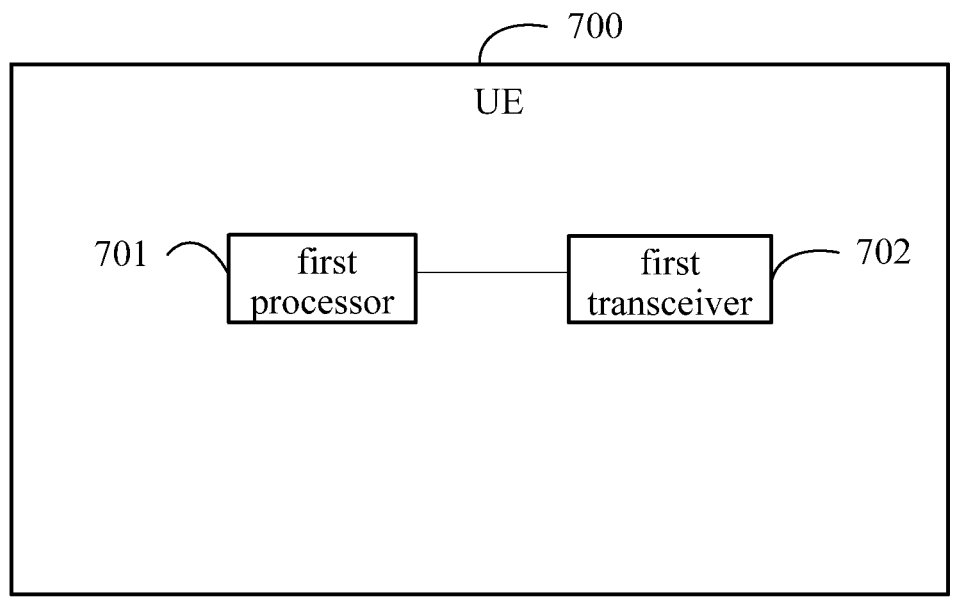
FIG. 7 is a schematic view showing a UE according to one embodiment of the present disclosure.

As shown in FIG. 7, the present disclosure further provides in some embodiments a UE 700 which includes a first processor 701 and a first transceiver 702. The first processor 701 is configured to initiate random access on one or more SS blocks, and the first transceiver 702 is configured to send random access information on each SS block to a network side device.

In a possible embodiment of the present disclosure, the first transceiver 702 is further configured to send the number of preambles sent on each SS block to the network side device, and the number of preambles sent on each SS block may include the number of preambles sent on each unsuccessfully-accessed SS block and/or the number of preambles sent on a successfully-accessed SS block.

In a possible embodiment of the present disclosure, the first transceiver 702 is further configured to send information about a time-frequency resource for the random access on each SS block to the network side device, and the information about the time-frequency resource may include an index with which the time-frequency resource is associated.

In this regard, the UE may initiate the random access on the one or more SS blocks, and send the number of preambles sent on each SS block and/or the information about the time-frequency resource for the random access on each SS block to the network side device. As a result, it is able for the network side device in a wireless communications system using a beamforming technology to know a random access conflict on each SS block, thereby to facilitate the optimization of random access parameters for the network side device.

Figure 8:
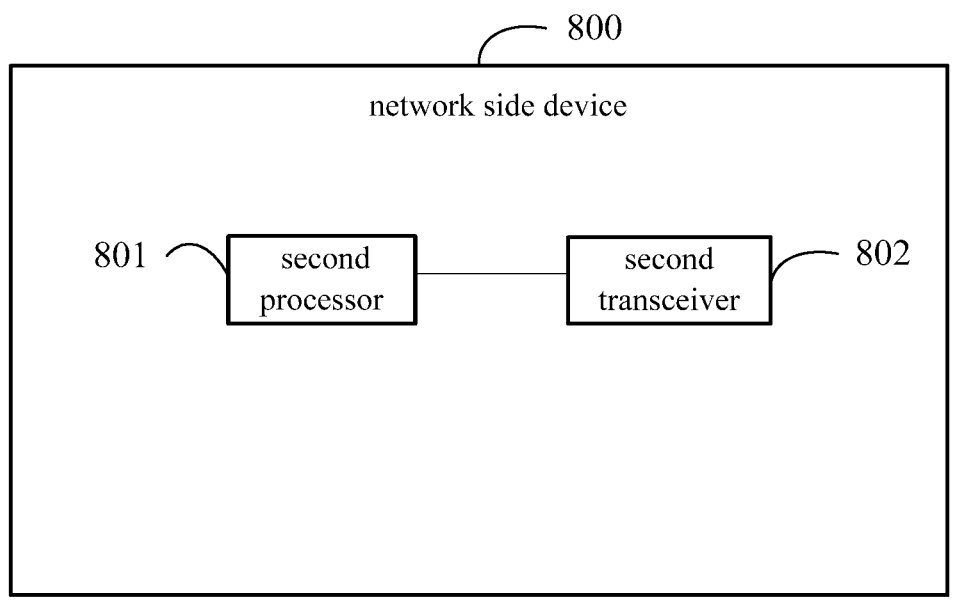
FIG. 8 is a schematic view showing a network side device according to one embodiment of the present disclosure.

As shown in FIG. 8, the present disclosure further provides in some embodiments a network side device 800 which includes a second processor 801 and a second transceiver 802. The second transceiver 802 is configured to receive random access information on each SS block from a UE.

In a possible embodiment of the present disclosure, the second transceiver 802 is further configured to receive the number of preambles sent on each SS block from the UE, and the number of preamble sent on each SS block may include the number of preambles sent on each unsuccessfully-accessed SS block and/or the number of preambles sent on a successfully-accessed SS block.

In a possible embodiment of the present disclosure, the second transceiver 802 is further configured to receive information about a time-frequency resource for random access on each SS block from the UE, and the information about the time-frequency resource may include an index with which the time-frequency resource is associated.

In this regard, the network side device may receive the number of preambles sent on each SS block and/or the information about the time-frequency resource for the random access on each SS block from the UE, so it is able for the network side device in a wireless communications system using a beamforming technology to know a random access conflict on each SS block, thereby to facilitate the optimization of random access parameters for the network side device.

Figure 9:
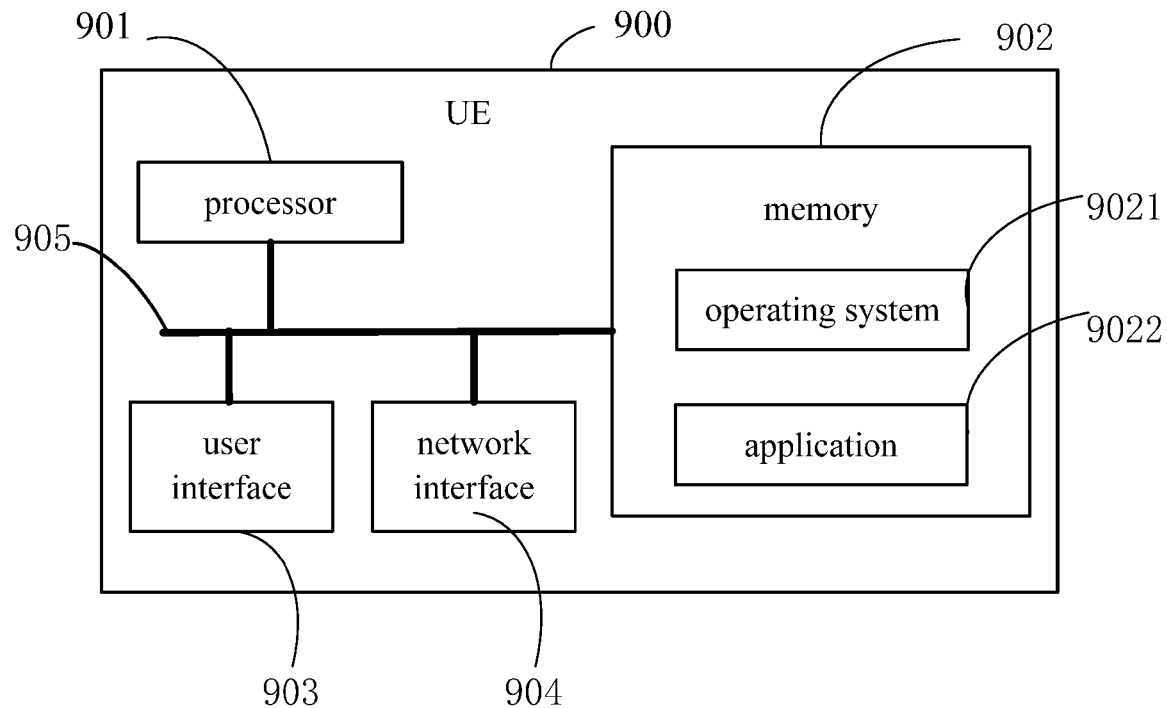
FIG. 9 is another schematic view showing the UE according to one embodiment of the present disclosure.

As shown in FIG. 9, the present disclosure further provides in some embodiments a UE 900 which includes at least one processor 901, a memory 902, a user interface 903 and at least one network interface 904. The components of the UE 900 may be coupled to each other via a bus system 905.

It should be appreciated that, the bus system 905 is configured to achieve connection and communication among the components. Apart from a data bus, the bus system 905 may further include a power source bus, a control bus and a state signal bus. For clarification, all these buses in FIG. 9 may be collectively called as bus system 905.

The user interface 903 may include a display, a keyboard or a pointing device (e.g., mouse, track ball, touch plate or touch panel).

It should be appreciated that, the memory 902 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but non-restrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 902 intends to include, but not limited to, the above-mentioned and any other appropriate memories.

In a possible embodiment of the present disclosure, the following elements may be stored in the memory 902: an executable module or data structure, a subset or an extended set thereof, an operating system 9021 and an application 9022.

The operating system 9021 may include various system programs, e.g., a framework layer, a core layer and a driving layer, so as to implement various basic services and process hardware-based tasks. The application 9022 may include various applications, e.g., Media Player and Browser, so as to implement various application services. The programs for implementing the above-mentioned method may be included in the application 9022.

In the embodiments of the present disclosure, the UE 900 may further include a computer program stored in the memory 902 and executed by the processor 901. The computer program is executed by the processor 901 so as to implement the above-mentioned method.

The above-mentioned method may be applied to, or implemented by, the processor 901. The processor 901 may be an integrated circuit (IC) having a signal processing capability. During the implementation, the steps of the above-mentioned method may be completed through an integrated logic circuit of hardware in the processor 901 or instructions in the form of software. The processor 901 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 902, and the processor 901 may read information stored in the memory 902 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

Figure 10:
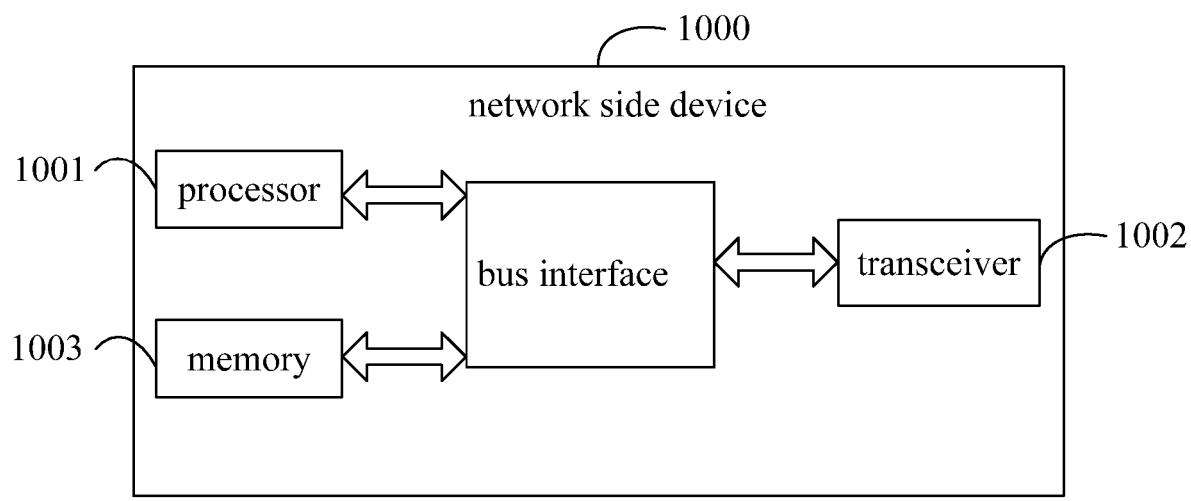
FIG. 10 is another schematic view showing the network side device according to one embodiment of the present disclosure.

As shown in FIG. 10, the present disclosure further provides in some embodiments a network side device 1000 which includes a processor 1001, a transceiver 1002, a memory 1003, a user interface and a bus interface.

The processor 1001 may take charge of managing the bus architecture as well as general processings. The memory 1003 may store therein data for the operation of the processor 1001.

In the embodiments of the present disclosure, the network side device 1000 may further include a computer program stored in the memory 1003 and executed by the processor 1001. The computer program is executed by the processor 1010 so as to implement the above-mentioned method.

In FIG. 10, bus architecture may include a number of buses and bridges connected to each other, so as to connect various circuits for one or more processors 1001 and one or more memories 1003. In addition, as is known in the art, the bus architecture may be used to connect any other circuits, such as a circuit for a peripheral device, a circuit for a voltage stabilizer and a power management circuit. The bus interface may be provided, and the transceiver 1002 may consist of a plurality of elements, i.e., a transmitter and a receiver for communication with any other devices over a transmission medium.

The present disclosure further provides in some embodiments a computer-readable storage medium storing therein a computer program. The computer program is executed by a processor so as to implement the above-mentioned method with a same technical effect, which will not be particularly defined herein. The computer-readable storage medium may be an ROM, an RAM, a magnetic disk or an optical disk.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A random access method performed by a User Equipment (UE), the random access method comprising:
   initiating random access on one or more Synchronization Signal (SS) blocks; and
   sending random access information on each SS block to a network side device,
   wherein the sending the random access information on each SS block to the network side device comprises:
   sending a number of preambles sent on each SS block by the UE to the network side device, wherein the number of preambles sent on each SS block comprises the number of preambles sent on each unsuccessfully-accessed SS block and the number of preambles sent on a successfully-accessed SS block.

2. The random access method according to claim 1, wherein the sending the random access information on each SS block to the network side device comprises:
   sending an SS block index to the network side device.

3. The random access method according to claim 1, wherein the sending the random access information on each SS block to the network side device comprises:
   sending information about a time-frequency resource for the random access on each SS block to the network side device.

4. The random access method according to claim 3, wherein the information about the time-frequency resource comprises an index with which the time-frequency resource is associated.

5. A random access method performed by a network side device, the random access method comprising:
   receiving random access information on each of one or more Synchronization Signal (SS) blocks from a User Equipment (UE),
   wherein the receiving the random access information on each SS block from the UE comprises:
   receiving, from the UE, a number of preambles sent by the UE on each SS block, wherein the number of preambles sent on each SS block comprises the number of preambles sent on each unsuccessfully-accessed SS block and the number of preambles sent on a successfully-accessed SS block.

6. The random access method according to claim 5, wherein the receiving the random access information on each SS block from the UE comprises:
   receiving information about a time-frequency resource for random access on each SS block from the UE.

7. The random access method according to claim 6, wherein the information about the time-frequency resource comprises an index with which the time-frequency resource is associated.

8. A network side device, comprising:
   a second processor and a second transceiver, wherein the second transceiver is configured to realize the random access method for the network side device according to claim 5.

9. The network side device according to claim 8, wherein the receiving the random access information on each SS block from the UE comprises:
   receiving a number of preambles sent on each SS block from the UE.

10. The network side device according to claim 8, wherein the receiving the random access information on each SS block from the UE comprises:
    receiving information about a time-frequency resource for random access on each SS block from the UE,
    wherein the information about the time-frequency resource comprises an index with which the time-frequency resource is associated.

11. A User Equipment (UE), comprising:
    a first processor and a first transceiver, wherein the first processor is configured to initiate random access on one or more Synchronization Signal (SS) blocks, and the first transceiver is configured to send random access information on each SS block to a network side device,
    wherein the first transceiver is further configured to:
    send a number of preambles sent by the UE on each SS block to the network side device, wherein the number of preambles sent on each SS block comprises the number of preambles sent on each unsuccessfully-accessed SS block and the number of preambles sent on a successfully-accessed SS block.

12. The UE according to claim 11, wherein the sending the random access information on each SS block to the network side device comprises:
    sending an SS block index to the network side device.

13. The UE according to claim 11, wherein the sending the random access information on each SS block to the network side device comprises:

sending information about a time-frequency resource for the random access on each SS block to the network side device.

14. The UE according to claim 13, wherein the information about the time-frequency resource comprises an index with which the time-frequency resource is associated.

* * * * *